Jan. 16, 1968  R. E. PORTER  3,364,381
VEHICLE SAFETY LIGHTS
Filed June 23, 1965
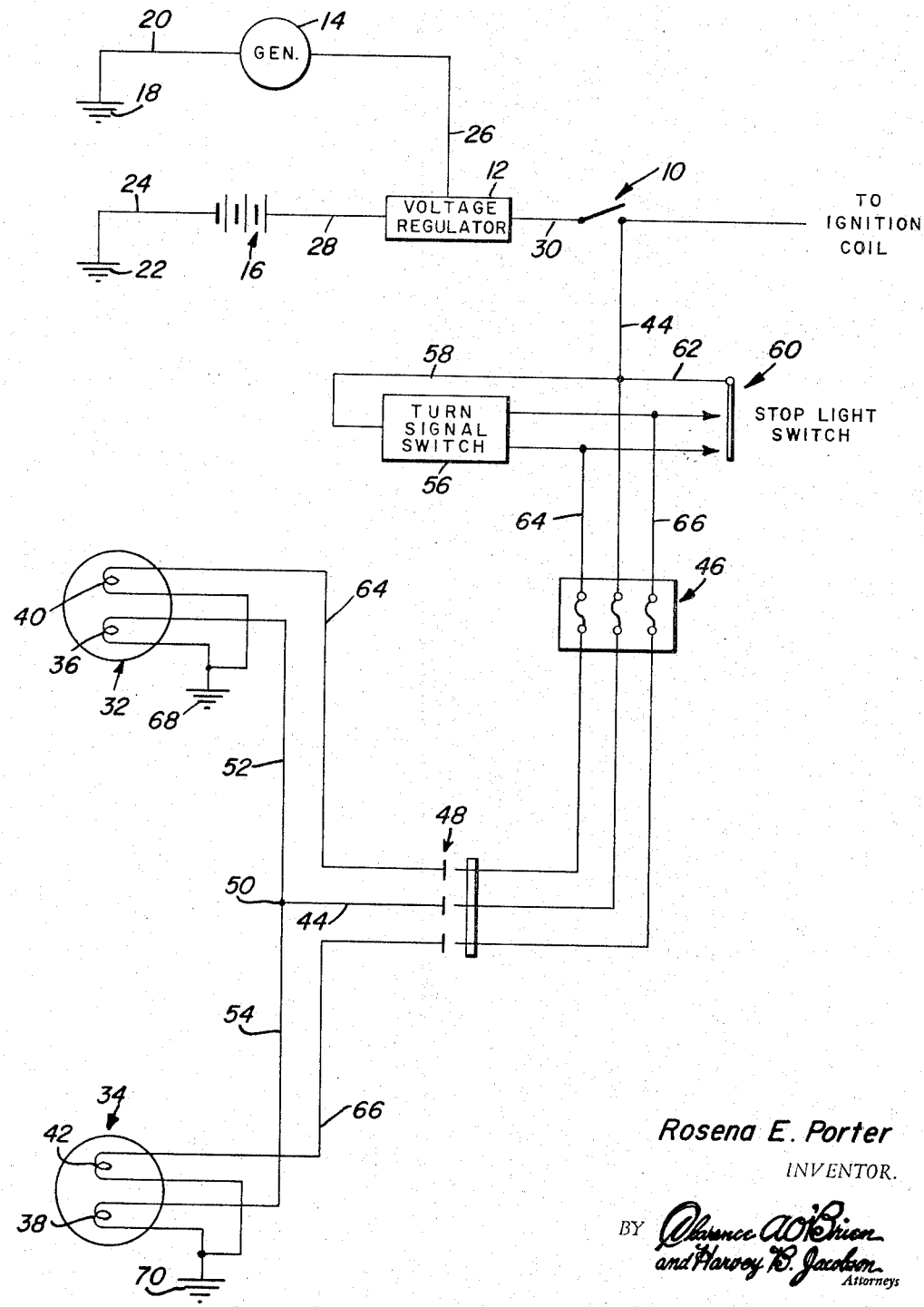
Rosena E. Porter
INVENTOR.

United States Patent Office 3,364,381
Patented Jan. 16, 1968

3,364,381
VEHICLE SAFETY LIGHTS
Rosena E. Porter, 2442 Cardenas St. NE.,
Albuquerque, N. Mex. 87110
Filed June 23, 1965, Ser. No. 466,203
9 Claims. (Cl. 315—77)

This invention relates to an electrical system for a vehicle such as a car, bus, truck or the like and more specifically to vehicle safety lights for use on such vehicles.

It is well known that the greatly increased volume of vehicles on the Nation's highways has lead to an intolerable number of traffic accidents and deaths. A dominant factor leading to such accidents is poor taillighting systems including taillights not visible due to poor maintenance in inclement weather.

It is therefore an object of the present invention to provide means for maintaining lights and warmth in the sealed beam units of vehicle taillights thereby maintaining taillights on at all times and providing heat in the sealed units to melt snow or ice and the like.

It is a further object of the present invention to provide a vehicle taillight unit of sealed construction having two separate light elements.

It is still a further object of the present invention to provide an electrical system for the taillights of vehicles wherein the taillights come on with the closing of the ignition switch.

It is a still further object of the present invention to provide an electrical system for taillights of vehicles wherein closing the ignition switch activates one element of a double element sealed beam taillight unit.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

The single figure is a view illustrating schematically the wiring diagram of the present invention.

Referring now more particularly to the drawings, there is illustrated a wiring diagram which represents a part of the electrical wiring circuit used in a vehicle. Reference numeral 10 refers to the ignition switch. The switch 10 is connected in series with an ignition coil (not illustrated). Switch 10 is further connected in series with a voltage regulator 12, the circuit continuing with generator 14 and D.C. battery, or electrical energy source 16 connected in parallel. Generator 14 is connected to ground 18 by wire or lead 20. Battery 16 is connected to ground 22 by wire or lead 24. Voltage regulator 12 is connected to the generator, battery and ignition switch by leads 26, 28 and 30 respectively.

Reference numerals 32 and 34 refer to identical taillight units of the "Sealed Beam" variety. It will be noted that units 32 and 34 contain two filaments each, the lower filaments 36 and 38 constituting constantly on, light and heater elements of relatively high resistance and relatively low illumination. The upper filaments 40 and 42 represent conventional taillight filaments.

Ignition switch 10 is connected by conductor 44 through a conventional junction fuse box 46 and electrical plug 48 in series to junction point 50, from which point the conductors 52 and 54 lead directly to the lower filaments 36 and 38. Thus, it may be seen that closing of normally open ignition switch 10 allows electrical energy to flow through a low resistance path from battery 16 to both filament 36 and 38, thereby providing light and heat at all times when the ignition is "on." The resistance of the auxiliary safety circuit is thus substantially confined to the high resistance filaments 36 and 38 so that the heat produced by flow of current will be confined to the lamp units 32 and 34.

Closing of ignition switch 10 also allows electrical energy to flow to turn signal switch 56 over conductors 44 and 58. The turn signal switch 56 is normally open. When ignition switch 10 is closed electrical energy also flows to stop light switch 60, which is normally maintained open and is closed only by operation of the brake pedal. When the stop light switch 60 is closed, electrical energy is allowed to flow to the switch 60 over conductors 44 and 62 and to upper filaments 40 and 42 over leads 64 and 66 and through the junction box 46 and plugs 48. Thus, it may be seen that sealed beam units 32 and 34 each have a first source of illumination and heat, filaments 36 and 38, which are on at all times when the ignition switch 10 is closed. When stop light switch 60 is closed, second, normally brighter sources of illumination in the form of both filaments 40 and 42 are activated. The turn signal switch 56 also may be closed to allow electrical energy to flow over either lead 64 or lead 66, to activate either filament 40 or 42. The filaments 36 and 40 lead to ground 68, and the filaments 38 and 42 lead to ground 70 in order to complete the circuit.

From the foregoing description it is readily apparent that the low light intensity and high resistance filaments 36 and 38 are maintained on upon closing of ignition switch 10, thereby maintaining a light and heating source on at all times internally of the signal lamp units when the car is in operation. Further, the normal brake and turn signals are activated by either the turn signal switch or the stop light switch, as these switches are connected in parallel between the battery 16 and the upper filaments 40 and 42. The ignition 10 is connected in series with the battery 16, the aforementioned parallel connection of turn signal switch and stop light switch, the junction box and the electrical box, and in parallel with the lower filaments 36 and 38.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a vehicle taillight electrical system, a taillight unit including first and second light filaments, an electrical energy source operatively coupled to said filaments, a normally open ignition switch, said first filament coupled to said ignition switch whereby upon closing said ignition switch said first filament receives electrical energy from said source, a normally open turn signal switch operatively connected to said second filament whereby upon closing said turn signal switch electrical energy flows to said second filament, and a normally opened stop light switch operatively connected to said second filament whereupon closing said stop light switch electrical energy flows to said second filament.

2. The apparatus of claim 1 wherein said turn signal switch and said stop light switch comprise a parallel connection between said ignition switch and said second filament.

3. The apparatus of claim 2 wherein said system includes first and second taillight units each including first and second filaments, said parallel connection connected in series between said source and each said second filament, and said ignition switch connected in series between said source and each said first filament.

4. A combined stop light, turn signal and warming lamp circuit for motor vehicles comprising a lamp unit including first and second filaments, a D.C. electrical energy source operatively coupled to said filaments, a normally open ignition switch connected in series between said source and said filaments, said first filament being energized by said source upon closing said switch, a normally open turn signal switch and a normally open stop light switch connected in parallel between said first named switch and said second filament, said turn signal switch operative to allow electrical energy to flow to said second filament when closed, and said stop light switch operative to allow electrical energy to flow to said second filament when closed whereby said lamp is maintained in a first on condition when said first named switch is closed and is selectively energized by closing of said stop light and turn signal switches.

5. The apparatus of claim 4 wherein said circuit includes first and second lamp units each having first and and second filaments, said parallel connection connected in series between said source and each said second filament, and said ignition switch connected in series between said source and each said first filament.

6. A taillight circuit for motor vehicles comprising first and second lamp means, each said lamp means including first and second filaments, electrical energy means operatively connected to said circuit, an ignition switch operatively connected to said circuit, each said first filament being energized by said source when said switch is in closed condition, a first signal switch operatively connected to said circuit, said second filaments being selectively energized by said source when said ignition switch and said first signal switch are in closed condition, a second signal switch operatively connected to said circuit, said second filaments being energized by said source when said ignition switch and said second signal switch are in closed condition.

7. In combination with a vehicle lighting system having at least two sealed lamp units which signal filaments selectively energized from a source of electrical energy after closing of an ignition switch, a safety device comprising, auxiliary filaments having relatively high resistances compared to the signal filaments enclosed within said sealed lamp units and means incorporated in said lighting system for continuously maintaining said auxiliary filaments energized upon closing of the ignition switch to provide illumination less brilliant than that of the signal filaments and to elevate the temperature of the lamp units.

8. In combination with a vehicle lighting system having a sealed lamp unit with a high level illumination producing filament energized from a source of electrical current upon closing of an ignition switch and a control switch, a safety device comprising an auxiliary, low level illumination producing filament enclosed within said lamp unit having a high resistance relative to the high level illumination producing filament, and conductor means electrically connecting the ignition switch to the auxiliary filament for continuous supply of energizing current thereto through a low resistance path upon closing of the ignition switch, whereby substantial heat is produced only at the auxiliary filament to maintain the lamp unit at an elevated temperature.

9. The combination of claim 8 wherein said lamp unit is a signal device the high level illumination producing filament of which is selectively energized upon closing of the control switch connected in series with the ignition switch to the source of current.

References Cited

UNITED STATES PATENTS 3,262,011   7/1966   Cones _____ 315—77

ROBERT SEGAL, *Primary Examiner.*

J. W. LAWRENCE, *Examiner.*

R. L. JUDD, *Assistant Examiner.*